United States Patent
Armstrong et al.

(10) Patent No.: US 9,698,979 B2
(45) Date of Patent: Jul. 4, 2017

(54) QKD KEY MANAGEMENT SYSTEM

(75) Inventors: Warren Armstrong, Acton (AU); Raymond Chan, Acton (AU); Ken Li Chong, Acton (AU); Russell Koehne, Acton (AU); Andrew Lance, Acton (AU); John Leiseboer, Acton (AU); Milind Neharkar, Acton (AU); Vikram Sharma, Acton (AU); H'sien Jin Wong, Acton (AU)

(73) Assignee: QUINTESSENCELABS PTY LTD., Deakin (AU)

( * ) Notice: Subject to any disclaimer, the term of this patent is extended or adjusted under 35 U.S.C. 154(b) by 0 days.

(21) Appl. No.: 14/111,445

(22) PCT Filed: Apr. 16, 2012

(86) PCT No.: PCT/AU2012/000390
§ 371 (c)(1),
(2), (4) Date: Jul. 21, 2014

(87) PCT Pub. No.: WO2012/139174
PCT Pub. Date: Oct. 18, 2012

(65) Prior Publication Data
US 2014/0331050 A1    Nov. 6, 2014

Related U.S. Application Data (60) Provisional application No. 61/475,875, filed on Apr. 15, 2011.

(51) Int. Cl.
*H04L 9/08* (2006.01)
*H04L 29/06* (2006.01)

(52) U.S. Cl.
CPC .......... *H04L 9/0855* (2013.01); *H04L 9/0819* (2013.01); *H04L 9/0852* (2013.01); *H04L 63/0442* (2013.01)

(58) Field of Classification Search
CPC ... H04L 9/0855; H04L 9/0819; H04L 9/0852; H04L 63/0442
USPC .................................................. 713/171, 181
See application file for complete search history.

(56) References Cited

U.S. PATENT DOCUMENTS

| | | | | |
|---|---|---|---|---|
| 5,495,533 | A | * | 2/1996 | Linehan .................. G06F 21/31 380/277 |
| 6,073,235 | A | * | 6/2000 | Foladare ................. H04L 9/083 370/320 |
| 2004/0184615 | A1 | * | 9/2004 | Elliott .................... H04L 9/0852 380/283 |
| 2008/0013738 | A1 | | 1/2008 | Tajima et al. |

(Continued)

FOREIGN PATENT DOCUMENTS

EP    1833009 A1    9/2007

OTHER PUBLICATIONS

Extended European Search Report for European patent application EP12771025 (Feb. 5, 2015).

(Continued)

*Primary Examiner* — Jeffrey D Popham
(74) *Attorney, Agent, or Firm* — Kilpatrick Townsend & Stockton LLP (57) ABSTRACT

A system for securely moving data from one location to another exchanges key material between the locations. The system enables cryptosystems to use key material distributed over a quantum channel.

16 Claims, 5 Drawing Sheets

(56) References Cited

U.S. PATENT DOCUMENTS

2010/0293380 A1\* 11/2010 Wiseman et al. ............. 713/169
2011/0243331 A1\* 10/2011 Yasuda ................. H04L 9/0662
 380/279

OTHER PUBLICATIONS

Mink et al. "High Speed Quantum Key Distribution System Supports One-Time Pad Encryption of Real-Time Video," Proc. of SPIE vol. 6244, pp. 62440M1-62440M7 (May 2006) 7 pages.
International Search Report for PCT patent application PCT/AU2012/000390 (Jul. 27, 2012).
Gabriel et al. "A generator for unique quantum random numbers based on vacuum states," Nature Photonics, vol. 4, No. 10, pp. 711-715 (Aug. 2010).
Lance et al. "No-switching quantum key distribution using broadband modulated coherent light," Phys. Rev. Lett. 95, 180503 (2005).
Symul et al. "Experimental demonstration of post-selection-based continuous variable quantum key distribution in the presence of Gaussian noise," Phys. Rev. 76 A, 030303(R), (2007) 4 pages.
Symul et al. "Real time demonstration of high bitrate quantum random number generation with coherent laser light," Appl. Phys. Lett. 98, pp. 231103-1 to 231103-3, (Jun. 2011).
Weedbrook et al. "Quantum Cryptography Without Switching," Phys. Rev. Lett. 93, 170504 (2004).

\* cited by examiner

QKD KEY MANAGEMENT SYSTEM

CROSS-REFERENCE TO RELATED APPLICATION

This application claims priority to U.S. Provisional Application 61/475,875 filed Apr. 15, 2011 the contents of which are incorporated by reference.

BACKGROUND OF THE INVENTION

This invention is in the field of information security, and relates in particular to cryptographic key generation, quantum key distribution, distributed key management, and redundant storage.

Conventional key management systems first generate or import key material on one node before replicating the key material to a redundant or backup node. These systems use database or file backup or replication to move key material between nodes. These systems rely on computational security to protect key material transferred between nodes, and are unable to efficiently manage key material for use with the one-time pad cipher.

BRIEF SUMMARY OF THE INVENTION

The present invention provides a cryptographic key management system incorporating key generation, information theoretic secure key distribution, and redundant storage. The system provides efficient management and delivery of key material for a one-time pad cipher, as well as other conventional ciphers.

In a preferred embodiment we provide a system for secure transfer of data for creation of encryption keys from a first system to a second system. The first system includes a random number generator, preferably operating in the quantum region, which provides bits representing random number. A quantum key distributor is coupled to the random number generator for receiving the bits representing random numbers and transmitting them to a second system. A quantum channel connects the quantum key distributor to the second node to enable transfer of the bits representing random numbers to the second node. The quantum channel operates in the quantum regime of light, allowing it to enable detection of interference with the quantum channel, e.g. by a third party attempting to compromise the information. A key storage in the first node stores encryption keys generated from the random numbers, and a key management system is coupled to the key storage for interfacing the first system with a system invoking the first system.

The invention also enables a method of transmitting data securely between a first communications device coupled to a first encryption system and connected by a potentially unsecure channel to a second communications device which in turn is coupled to a second encryption system. Preferably the method includes steps of receiving data at the first communications device and obtaining a first key identifier and associated first key material from a key manager in the first encryption system. Then a step is performed of using the first key material to encrypt the data received at the first communications device to provide encrypted data. The encrypted data and the first key identifier are transmitted over the potentially unsecure channel to the second communications device.

At the second communications device, the first key identifier is extracted from the transmitted data. Then using the first key identifier, corresponding first key material is retrieved from the second encryption system. Using the first key material, the encrypted data is decrypted. Because the first encryption system communicates with the second encryption system over a quantum channel connecting a first quantum key distributor in the first encryption system with a second quantum key distributor in the second node, the transfer of bits representing the retrieved random number may be sent to the second node in a secure manner. The quantum channel operating in the quantum regime of light to enables detection of interference with the quantum channel.

DETAILED DESCRIPTION OF THE INVENTION

Figure 1:
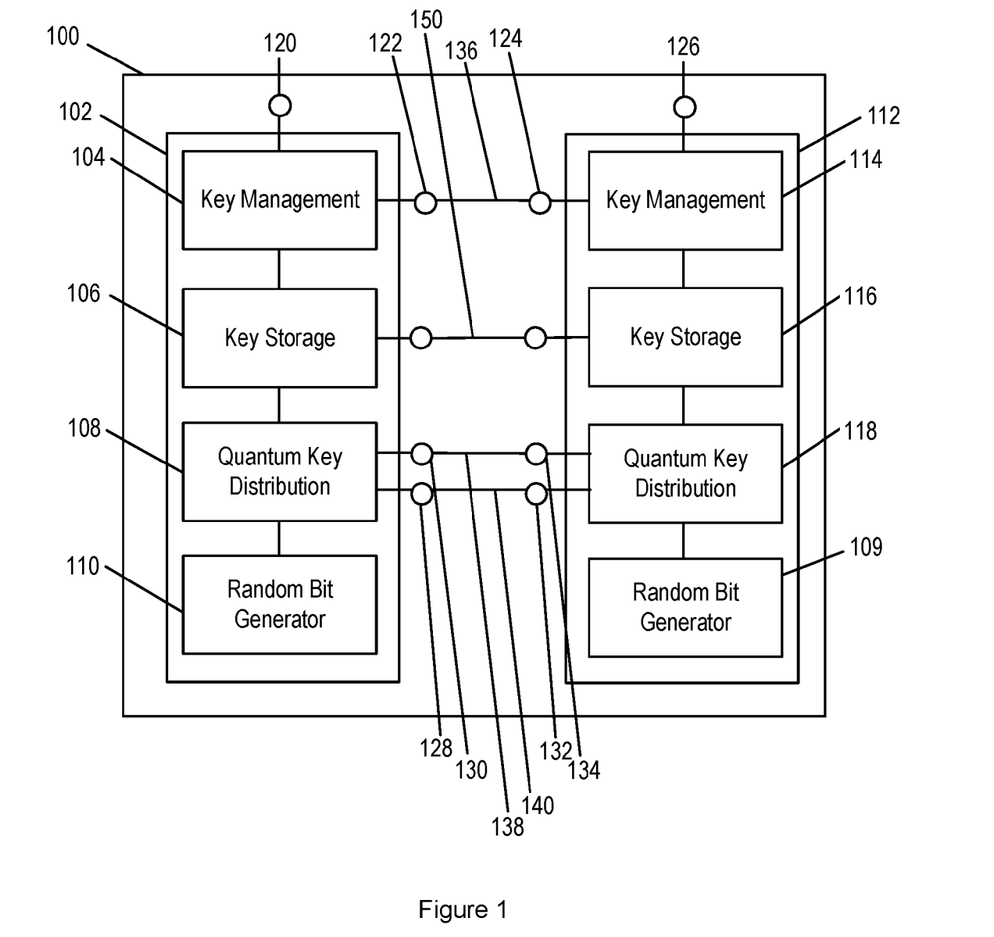
FIG. 1 is a block diagram of the quantum key distribution key management system.

FIG. 1 is a functional block diagram of a preferred embodiment of a quantum key distribution and key management system. The QKD key management system 100 consists of two nodes 102 and 112 which are coupled to server interfaces 120 and 126, respectively. The two nodes 102 and 112 are connected by communication channels—a quantum channel 140, a classical channel 138, a key management channel 136, and a key storage channel 150. The quantum channel 140 is a channel through which quantum states of light encoded with random bits are transmitted from node to node. The quantum channel is a conduit that facilitates the transport of light between the nodes. It may, for example, be an optical dark fibre link or a free-space connection. The classical channel 138 is a conventional communication channel, for example, as might be found in an Ethernet based local area network, a Wi-Fi link, a FibreChannel link, or similar communications channel. The key management channel 136 is also a conventional communication channel like that of channel 138, but one over which key management information is provided. Messages exchanged over the classical channel 138 and the key management channel 136 are protected by a Message Authentication Code (MAC) to ensure the integrity of messages between two nodes 102 and 112. These codes are also used to authenticate the identity of the sending node. A communications channel 150 is also provided between the key storage in node 102 and node 112. Messages over this channel are also authenticated using MACs.

Node 102 includes a random bit generator (RBG) 110. The random bit source provides random bits for use as key material. Node 112 also includes a source of random bits 109. In some implementations of the invention, this source is used to generate key material. In the preferred embodiment, random bit generator 110 provides cryptographically strong random bits—knowledge of the current state of the RBG is insufficient to retrieve previously generated outputs, and observation of RBG outputs is insufficient to predict future outputs. Examples of a sufficiently secure random bit source are described in "A generator for unique quantum random numbers based on vacuum states," C. Gabriel, C.

Wittmann, D. Sych, R. Dong, W. Mauerer, U. L. Andersen, C. Marquardt and G. Leuchs, Nature Photonics, vol. 4 no. 10 pp. 711-715, 2010; and in "Real time demonstration of high bitrate quantum random number generation with coherent laser light," T. Symul, S. M. Assad and P. K. Lam, Appl. Phys. Lett. 98, 231103, 2011. The contents of each of these documents is incorporated by reference herein.

Quantum key distribution (QKD) blocks 108 and 118 provide for quantum key distribution. Each block provides a quantum channel interface 128 and 132, and a classical channel interface 130 and 134. The quantum channel interface 128 on the transmitting node 102 is implemented as an electro-optical modulator that converts an electrical signal into an optical signal. The quantum channel interface 132 on the receiving node 112 is implemented as a photo-detector that converts an optical signal into an electrical signal. The classical channel interfaces 130 and 134 are system calls that relay data through the operating system's network stack onto network interface cards (NICs). Quantum key distribution 108 receives a stream of random bits from the random bit source 110. These bits are encoded onto quadrature observables of the quantum states of light, and then transmitted to QKD node 118 over the optical quantum channel 140. The receiving QKD node 118 makes measurements of the quadrature observables of the received quantum states of light using homodyne detectors.

The quantum channel 140 is characterised by analysing a subset of the data transmitted from QKD node 108 and received by QKD node 118. This subset consists of elements randomly selected using input from the random bit generator 109—addressing information transmitted from node 118 to node 108 over the classical channel 138 enables node 108 to select an identical subset. This characterisation results in estimates of channel parameters: the attenuation of the signal, the variance of the signal and the noise added to the signal by its passage through the channel. Other parameters are pre-computed for a given set of hardware: the optical insertion loss at the receiving QKD node 118, the dark noise on the photodetectors at the receiving QKD node 118. These parameters are used to compute an upper bound on the information available to any eavesdropper. This bound is used together with the mutual information between the two QKD nodes 108,118 and the efficiency of the error correction algorithm (a precomputed value) in order to derive the informational advantage of the QKD nodes 108,118 over possible eavesdroppers. This bound is used to drive a series of manipulations (post-selection, error correction and privacy amplification) of the shared key that results in a subset of the key about which no eavesdropper has information.

Operational messages relating to these manipulations (as well as to the earlier characterisation step) are transmitted over the classical channel 138. Messages on this channel are authenticated and integrity protected using message authentication codes. The messages may also be encrypted. The QKD nodes 108 and 118 produce information-theoretically secure key material which is transferred to the key storage facilities 106 and 116 in each node.

Our implementation of quantum key distribution builds on published theoretical and experimental work. See, e.g., "No-switching quantum key distribution using broadband modulated coherent light," A. M. Lance, T. Symul, V. Sharma, C. Weedbrook, T. C. Ralph and P. K. Lam, Phys. Rev. Lett. 95, 180503, 2005; "Experimental demonstration of post-selection-based continuous-variable quantum key distribution in the presence of Gaussian noise," T. Symul, D. A. Alton, S. M. Assad, A. M. Lance, C. Weedbrook, T. C. Ralph and P. K. Lam, Phys. Rev. 76 A (R), 030303, 2007; and "Quantum Cryptography Without Switching," C. Weedbrook, A. M. Lance, W. P. Bowen, T. Symul, T. C. Ralph and P. K. Lam, Phys. Rev. Lett. 93, 170504, 2004. The contents of each of these documents is incorporated by reference herein.

Figure 2:
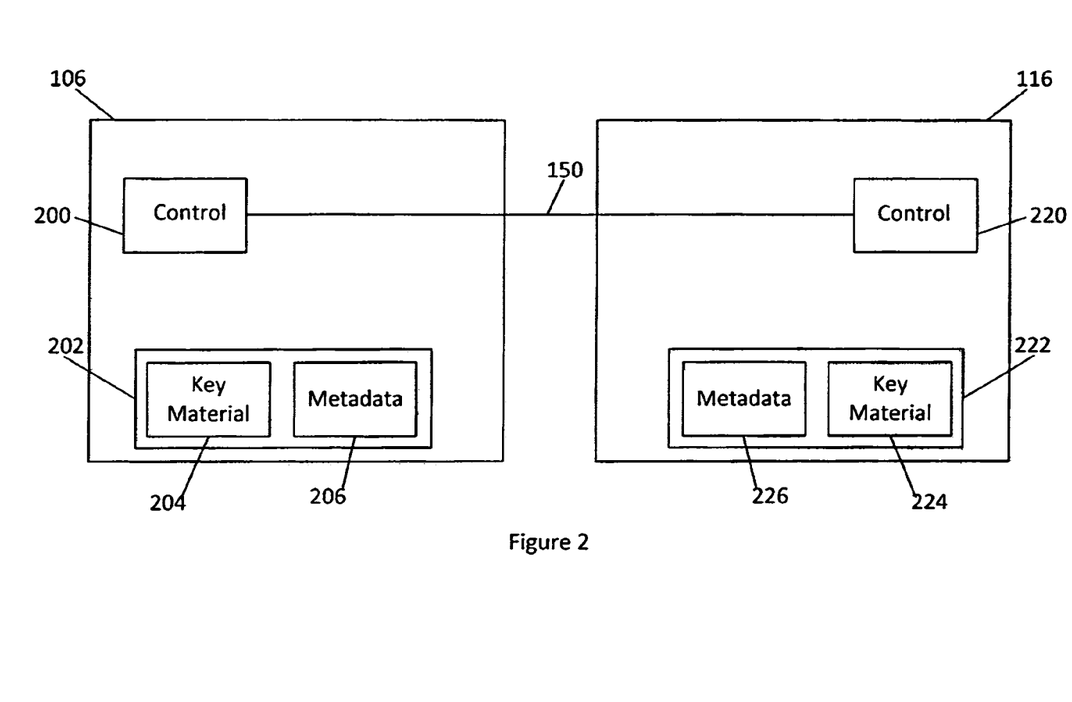
FIG. 2 is a more detailed block diagram of the key storage blocks shown in FIG. 1.

The key storage blocks 106 and 116 shown in FIG. 1 provide storage for key material obtained from the respective QKD function blocks 108 and 118. FIG. 2 is a functional block diagram illustrating these components in more detail. Each key storage block contains a database 202 and 222 which stores key material 204 and 224, and descriptive metadata 206 and 226 in a persistent manner. Key material arrives in the key storage block 106 and 116 from the QKD block 108 and 118. It is received by controlling software 200 and 220. The software components in each node coordinate their activities over a communications channel 150. The communications protocol ensures that the key material 204 and 224, and metadata 206 and 226, remain synchronised. The descriptive metadata 206 and 226 provides information about the volume and location of the stored key material.

Key material is extracted from the key store when required by the key management blocks 104 and 114. Extraction requires the exchange of metadata over the communications channel 150 to keep both nodes synchronised. For an additional layer of data integrity assurance, the nodes exchange hashes of the extracted key material. Equality of these values reduces the probability of asymmetric data corruption.

Figure 3:
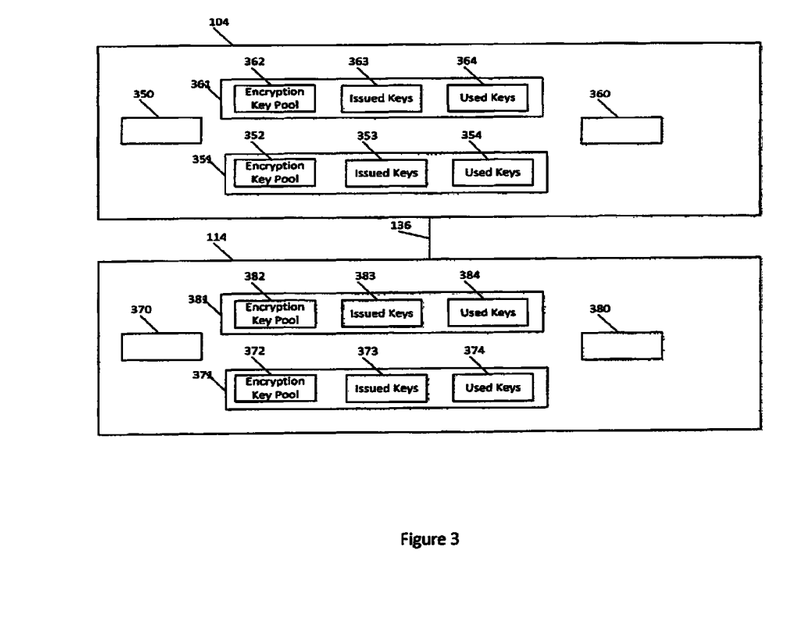
FIG. 3 is a block diagram of the key management blocks.

The key management blocks 104 and 114 shown in FIG. 1 provide external clients with an interface to the key storage 106 and 116. FIG. 3 is a functional block diagram illustrating the key management blocks 104 and 114 in more detail. Each key management block 104 and 114 controls two sets of keys: a first set 361 and 371 is used to protect and process, respectively, communications from block 104 to block 114, while the second set 381 and 351 is used to protect and process, respectively communications from block 114 to block 104. Preferably each set of keys resides in a discrete region of system memory.

Each key management block contains a function 350 and 370 that retrieves fixed-size chunks of key material from the key storage 106 and 116. The key material is placed into a pool of available processing keys 352 and 372. Messages exchanged over the key management channel 136 cause corresponding keys to be placed in the protecting key pools 362 and 382. The causal relationship enforces the condition that every key available for protection is also available for processing.

When external client software running on one node desires to protect (e.g: encrypt) a message to the peer node, the client requests a key identifier be assigned to it. The key management logic 104 and 114 assigns the first key identifier from the pool of available processing keys 362 and 372 and transmits the assignment to the peer node over the communications channel 136. The sending node moves the assigned key to a pool of issued protection keys 363 and 373, while the receiving node moves the assigned key into a pool of issued processing keys 353 and 383. Upon each key entering a pool of issued keys 353, 363, 373 and 383, it is associated with an expiry time. Should the key not be removed from the pool before its expiry time is reached, the key is recycled as described below.

Once it has a key identifier, the sending client requests enough key material to protect its message from the chunk of key material associated with that identifier. The key management logic 104 and 114 removes the consumed key material from the material associated with the key identifier. The key is then moved into the pool of used protecting keys 364 and 374.

External client software desiring to process (e.g: decrypt) a message must be in possession of a key identifier. The client passes this key identifier to the key management logic 104 and 114. The key management block searches for a matching key in the pool of issued processing keys 353 and 383 and the pool of available processing keys 352 and 382. Synchronisation of the key generation process guarantees that the key is present in one of the two pools.

Once a matching key is found, the requested volume of key material is returned to the, client and the key is passed into the pool of used decryption keys 354 and 384. These pools are monitored by the software 360 and 380 responsible for key reuse as discussed next.

Each node contains a function 360 and 380 that allows the unconsumed portions of keys to be reused. Such reuse prevents the waste of any unused portions of a chunk of key material. Given a fixed rate of key generation, this parsimony allows the system to support higher key request rates. Keys for reuse are drawn from the pools of used keys 354, 364, 374 and 384 and from issued keys 353, 363, 373 and 383 which have expired. Reuse is performed by replacing the consumed portion of the key with material drawn from the key storage 106 and 116. The key is then processed in the same manner as newly generated keys, that is, as described above.

The system of our invention provides several advantages over prior art systems. For example, key material is jointly generated on both nodes and does not require subsequent replication. The distribution of raw key material and its transformation into secure key material is done in an information theoretically secure manner. The system efficiently manages and distributes key material for use with one-time pad ciphers as well as with conventional cipher algorithms.

Next we describe two examples of use of the invention. A first example concerns protecting data in transit between physically disparate nodes. The other example is of protecting data resident within a single node.

Figure 4:
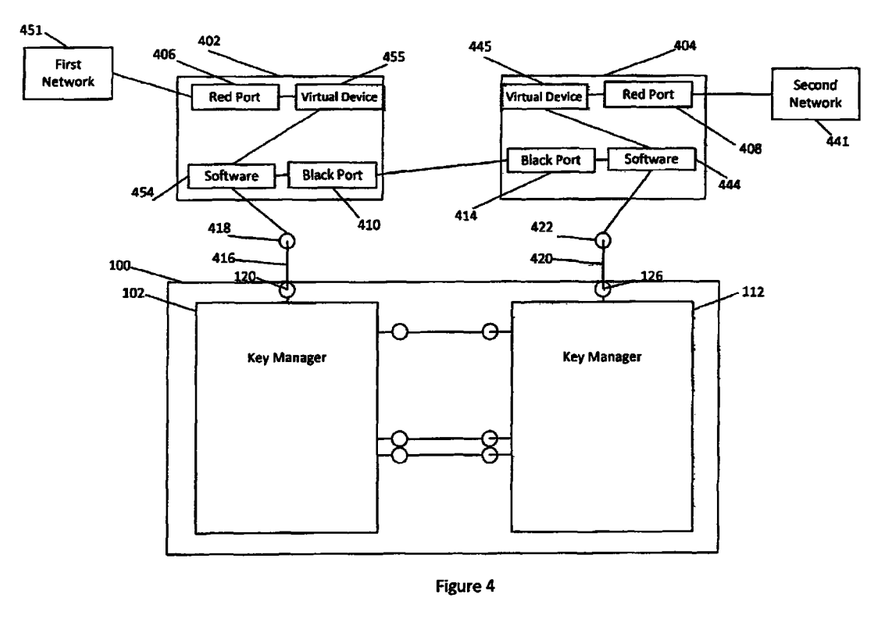
FIG. 4 illustrates a technique for encrypting and authenticating data between two networks connected over an untrusted connection.

Key data managed by the invention can be used to encrypt and authenticate data between two networks connected over an untrusted connection. FIG. 4 illustrates how the invention provides this facility between two networks. Traffic from the first network 451 is routed into the red (secure) port 406 of a link encryptor 402. This port is implemented using an Ethernet card which is bridged to an Ethernet-level virtual network device 455.

Traffic arriving on the virtual device 455 is read by software 454 running inside the link encryptor 402. This software 454 obtains a key identifier and associated key material from the key manager in node 102. The key material is used to encrypt the traffic, using either one-time pad or a traditional cipher algorithm. The ciphertext and the associated key identifier may be augmented with a message digest or other form of message authentication. The ciphertext, the key identifier and any authentication information are transmitted from the link encryptor's (insecure) black port 410, which is connected to an untrusted network—the second network 441.

The message is received by the (insecure) black port 414 of the peer link encryptor 404. Software 444 within the link encryptor 404 verifies the message against any included authentication tokens. It then extracts the key identifier and retrieves the indicated key material from the key management component 112. The key material is used to decrypt the enciphered traffic, producing plaintext. This text is injected into an Ethernet-level virtual network interface 445 which is bridged to the (secure) red port 408 of link encryptor 404. This results in the traffic from the first network arriving on the second network 441.

The above method is bidirectional. Traffic from the second network 441 enters link encryptor 404 over the red port 408 and is bridged to a virtual Ethernet device 445. The traffic is encrypted using a key acquired from the QKD node 112. The enciphered traffic and a key identifier are transmitted from the black port 414 of link encryptor 404 over an untrusted network. The ciphertext arrives on the black port 410 of link encryptor 402 and is bridged through a virtual Ethernet device 454 to software. The software extracts the key identifier and retrieves the appropriate key material from the QKD node 102. This key material is used to decrypt the ciphertext and the resulting plaintext is then transmitted out of the red port 406 to the trusted network 451.

Figure 5:
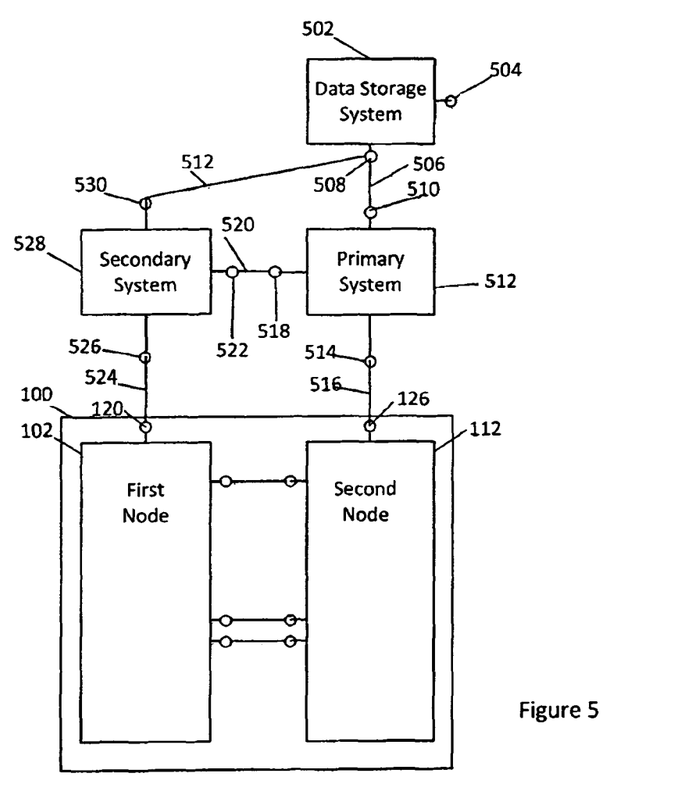
FIG. 5 illustrates a technique for protecting data using a quantum key distribution system.

FIG. 5 illustrates a second example of how our system can be used to protect data residing in a storage medium such as a hard disk drive, disk array, tape drive, storage area network or similar facility. Data stored in the data storage system 502 is secured using cryptographic cipher algorithms. The necessary key material is extracted from a quantum key distribution node 112 and stored in a separate storage system 512. The quantum key management system uses a second QKD node 102 and an administrative link 520 to replicate the key material within a secondary storage system 528 which can be used for archival, redundancy, escrow or recovery purposes. The replication process is information-theoretically secure.

The replication provides robust protection for the stored data. Because the cryptographic material necessary to access the data is stored in an external system 512, compromise of the system 502 does not necessarily compromise the protected data. Furthermore, failure of system 512 does not render the protected data inaccessible because the cryptographic key material needed to retrieve the data may instead be sourced from the secondary system 528. The role of the key management system in this implementation is twofold. First, it assures that the key material replication at node 528 is secure. Second it assures that the key material was created using the high quality entropy provided by the random bit generator within that node. A hypothetical eavesdropper cannot compromise the system by attacking the links 520, 138 and 140 because sensitive material is not transmitted across these links. In addition, the random bit generator within the node protects the system against predictive attacks that exploit inadequate entropy. Vulnerability to such attacks is a known problem in security systems.

The data storage system 502 supports a data client interface 504 and a key management client interface 508, both of which facilitate communication over a classical network. The primary key storage system 512 supports a key server interface 510, a QKD client interface 514 and an administrative interface 518, all of which enable communication over a classical network. The secondary key storage system 528 also supports a key server interface 530, a QKD client interface 526 and an administrative interface 522, each of which connects the system to a classical network The data storage system is connected to a secondary key storage system 528 by the secondary key server interface 530. Different operational modes utilise this interface in different ways. For example, the secondary key server interface 530 can be closed to outside connections unless the primary key storage system 512 fails, in which case an administrator may open this interface to enable communication between the data storage system 502 and the key replication facility 528. Alternatively, the system could be configured to automatically failover to the secondary key storage system 528 in the event that the primary key storage system 512 fails.

Key management client interface 508 connects to the key server interface 510 via a trusted communication channel 506. In event of the failure of the primary key storage system 512, it may instead connect to the key server interface 530 via a trusted communication channel 512. Note that depending on the mode of operation channel 512 may be established only as required.

The key storage system 512 uses the quantum key distribution client interface 514 to connect to the server interface 126 of a QKD node 112 via a trusted communication channel 516. The secondary key storage system 528 uses its QKD client interface 526 to connect to the server interface 120 of a peer QKD node 102 via a trusted communication channel 524. The two key storage nodes exchange administrative information using interfaces 518 and 522 to a potentially untrusted channel 520.

Data enters and leaves the data storage system 502 through a client interface 504. The client provides both database requests and identity authentication to system 502. When storing data, the storage system 502 uses the key management client interface 508 to request a key identifier and associated key material from the primary key storage system 512. In turn, system 512 uses the QKD client interface 514 to obtain a key identifier and associated key material from the QKD node 102, via channel 516 and server interface 126. System 512 stores this key material, its key identifier, and the client identity. It then uses the administrative channel 520 to inform the secondary key storage system of the chosen key identifier/client identity. The secondary system 528 will then request the key material corresponding to this identifier from QKD node 102 via channel 524 and server interface 120. It also stores the relevant key material, key identifier and client identity.

Internally, the data storage system 502 stores the data and protects it. The protection uses the key material obtained from the QKD node to perform one or more cryptographic operations such as encryption, message authentication, message digest, or digital signature. The key identifier is stored alongside the protected data, but the key material is not. Thus, future access to the data requires using the key management client 508 and the stored key identifier to re-obtain the necessary key material to access the protected data.

When requesting data, the data system 502 provides the required key identifier to the key storage 512, along with the identity of the client making the request. The key storage 512 will look up the key identifier/client combination, ensure that the client has the permissions required to access this key material and then send the key material to system 502. This will enable 502 to access the cryptographically protected data and fulfil the client request. The QKD key management system 100 ensures that key material requested from each QKD node 102 and 112 is consistent, replicated, and synchronised. Thus, the key stores 512 and 528 store identical key material and either may service requests for a particular key identifier.

The preceding has been a description of preferred embodiments of the invention. It should be appreciated that various implementation details have been provided to enable a better understanding of the invention whose scope is set forth in the appended claims.

We claim:

1. A first node-comprising:
    a quantum channel interface comprising an electro-optical modulator providing a quantum channel connecting the first node to a second node;
    a non-deterministic random bit generator configured to generate cryptographically strong random bits;
    a quantum key distributor configured to distribute the random bits to the second node via the quantum channel;
    a key storage system configured to store at the first node the random bits that have been distributed to the second node, together with metadata identifying volume and location of the stored random bits;
    a key management system configured to:
        generate keys by extracting fixed-size chunks of the random bits from the key storage system and store the generated keys in an encryption key pool at the first node;
        receive a request from a first external system coupled to the first node for encrypting data;
        provide a key identifier to the first external system, in response to the request, wherein the key identifier is associated with a key from the generated keys;
        move the key associated with the key identifier to an issued keys pool at the first node;
        receive an indication of an amount of key material needed for encrypting the data by the first external system;
        provide the key material for encrypting the data from the key associated with the key identifier to the first external system; and
        move the key associated with the key identifier to a used keys pool at the first node; and
    the key storage system further configured to exchange the metadata with a key storage system of the second node to synchronize the random bits and the metadata between the first node and the second node, upon extraction of the fixed-size chunks of random bits by the key management system of the first node from the key storage system of the first node.

2. The first node of claim 1 wherein the quantum channel conveys a stream of quantum states representing the random bits from the first node to the second node.

3. The first node of claim 2 wherein the stream of quantum states is interpreted by the second node as the generated random bits.

4. The first node of claim 2 wherein the random bits are encoded onto quadrature observables of the quantum states of light and then transmitted to the second node over the quantum channel.

5. The first node of claim 4 wherein the quantum channel comprises an optical quantum channel.

6. The first node of claim 1 further comprising:
    a classical channel interface providing a classical channel coupling the first node to the second node.

7. The first node of claim 6 wherein the classical channel provides authenticated communication between the first node and the second node.

8. The first node of claim 7 wherein the classical channel enables recovery of synchronised random bits from noise in the quantum channel.

9. The first node of claim 8 wherein the first node further maintains synchronisation between the key management system in the first node and a corresponding key management system in the second node using the classical channel.

10. The first node of claim 1 further comprising:
a key management interface providing a key management channel coupled to the quantum key distributor for sending key management information to the second node.

11. The first node of claim 10 wherein the key storage system includes storage for encryption keys which have been generated using the random bits.

12. The first node of claim 11 wherein the key storage system further includes storage for storing encryption keys after they have been used.

13. The first node of claim 1 further comprising storing the key material and the key identifier in system memory.

14. The first node of claim 1 is further configured to:
associate each key, from the generated keys, that is moved to the issued keys pool with a respective expiry time; and
upon expiry of an expiry time associated with a given key, generate a new key using random bits from the given key.

15. The first node of claim 1 is further configured to: use unused random bits from the key moved to the used keys pool to generate a new key.

16. A method performed by a first node comprising:
receiving cryptographically strong random bits generated by a non-deterministic random bit generator of the first node;
distributing the generated random bits to a second node using an electro-optical modulator via the a quantum channel from a quantum key distributor of the first node;
storing the random bits that have been distributed to the second node using a key storage system at the first node, together with the metadata identifying volume and location of the stored random bits;
generating keys by extracting fixed-size chunks of the random bits from the key storage system and storing the generated keys in an encryption key pool at the first node;
receiving a request from a first external system coupled to the first node for encrypting data;
providing a key identifier to the first external system, in response to the request, wherein the key identifier is associated with a key from the generated keys;
moving the key associated with the key identifier to a issued keys pool at the first node:
receiving an indication of an amount of key material needed for encrypting the data by the first external system;
providing the key material for encrypting the data from the key associated with the key identifier to the first external system;
moving the key associated with the key identifier to a used keys pool at the first node; and
exchanging the metadata with a key storage system of the second node to synchronize the random bits and the metadata between the first node and the second node, upon extraction of the fixed-size chunks of random bits from the key storage system of the first node.

\* \* \* \* \*